United States Patent [19]

DeRemer

[11] 4,188,867
[45] Feb. 19, 1980

[54] DOOR MECHANISM FOR APPLIANCES

[75] Inventor: Harold A. DeRemer, Allentown, Pa.

[73] Assignee: General Electric Company, New York, N.Y.

[21] Appl. No.: 1,647

[22] Filed: Jan. 8, 1979

[51] Int. Cl.² .............................................. A47J 37/00
[52] U.S. Cl. ........................................ 99/385; 99/401; 99/425
[58] Field of Search ........................... 99/385, 337–339, 99/386–400, 401–403, 422, 425; 49/463–465; 219/10.55 C, 10.55 D, 413, 414; 200/61.7, 61.76; 126/191, 194

[56] References Cited

U.S. PATENT DOCUMENTS

| 2,934,059 | 4/1960 | Baker | 126/194 |
| 3,585,360 | 6/1971 | Young | 99/401 |
| 3,685,434 | 8/1972 | Harrison | 99/425 |

Primary Examiner—George F. Mautz
Assistant Examiner—Arthur O. Henderson
Attorney, Agent, or Firm—Leonard J. Platt; George R. Powers; John F. Cullen

[57] ABSTRACT

A toaster/oven having a door and a door frame and door jam peripherally surrounding the cooking chamber front opening. The door is pivotally mounted on two hinge pins, a first hinge pin being received in an opening on one side of the door frame and a second hinge pin being received in a slot on the other side of the door frame. The geometry of the slot and pin position on the door is such that the door is not removable except when in its fully opened position. The toaster/oven also comprises door retention means for selectively holding the door in a closed, partially open broil and a fully opened position. The pivotal movement of a lever arm operates first and second switch means which respectively cut off power to the heating elements of the toaster/oven and provide a signal to the controls of the toaster/oven when the door is open. The switches comprise leaf spring conductors biased toward terminals, and a bell crank rocked by the lever arm displaces the leaf spring conductors from their respective terminals to open the switches.

18 Claims, 9 Drawing Figures

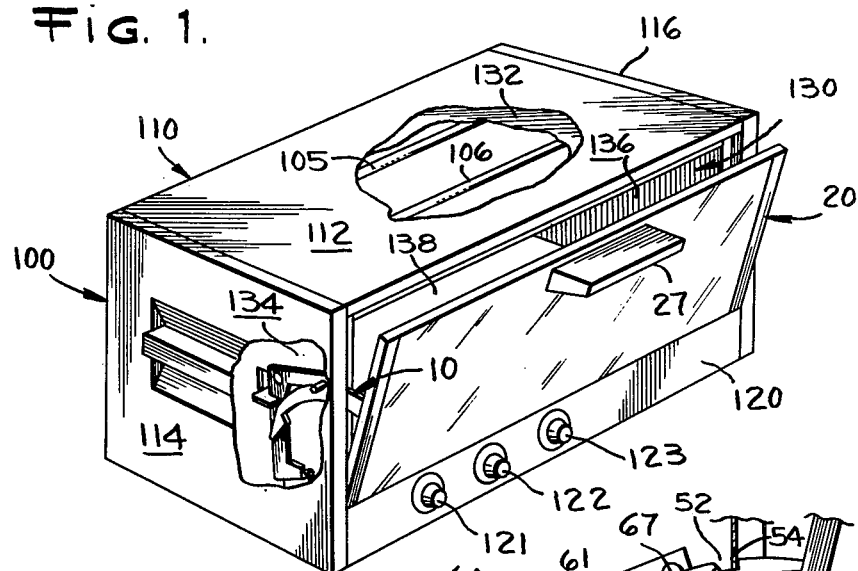
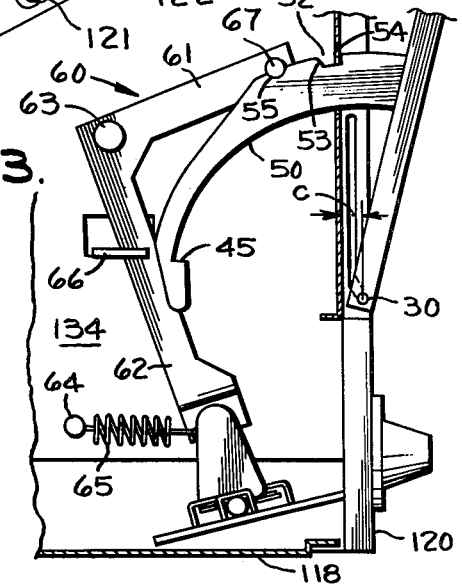
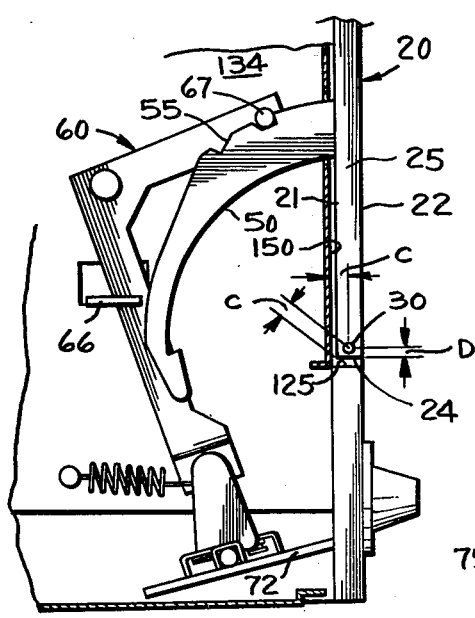
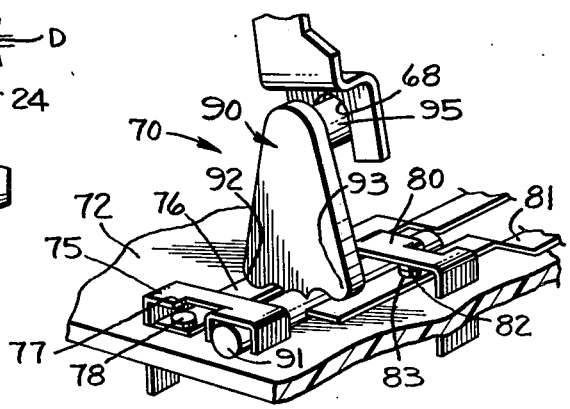

DOOR MECHANISM FOR APPLIANCES

BACKGROUND OF THE INVENTION

This invention relates to a door mechanism for an electrical appliance, such as a toaster/oven, the door mechanism comprising a pivotally and removably mounted door, the door having positioning means for selectively retaining the door in various positions and operating a switch depending upon the position of the door.

A prior art toaster/oven typically has a pivotally mounted door which closes the front of the cooking chamber. The cooking chamber generally encloses exposed electrical heating elements, which provide heat for baking, broiling, toasting or other cooking operations of the toaster/oven. The toaster/oven generally includes controls, such as switches, timers and thermostats, for controlling the cooking of food items. Toaster/ovens are well-known and useful appliances, but have not been fully developed for maximum ease of operation.

It is desirable that the door of a toaster/oven be selectively retainable in a closed position, an open position and partially open broil position to permit air circulation and the escape of cooking smoke and the like, and that the door be freely pivotable between these positions. It is further desirable that the door be removable to facilitate cleaning of the cooking chamber, and that removal and reinstallation of the door be easily accomplished. Because the electrical heating elements within the cooking chamber are somewhat dangerous if touched, it is advantageous to shut off the power to the electrical heating elements when the door is either opened beyond the broil position or removed for cleaning the cooking chamber. Since the cutting off of power to the electrical heating elements when the door is opened may affect the outcome of cooking processes, it would be desirable to provide a signal to the controls of the toaster/oven indicating that the door is open so that the controls can compensate for loss of heat from the cooking chamber and/or loss of cooking time.

These advantages and desirable features have not been provided satisfactorily in prior art toaster/ovens or other similar appliances, despite the existing need for them.

SUMMARY OF THE INVENTION

It is a principal object of the invention herein to provide an improved door mechanism for electrical appliances, such as toaster/ovens.

It is another object of the invention herein to provide a door mechanism which selectively retains the door in closed, broil and open positions.

It is a further object of the invention herein to provide a door mechanism in which the door is easily removable and replaceable.

It is an additional object of the invention herein to provide a door mechanism which cuts off power to heating elements when the door is opened beyond the broil position or removed.

It is yet another object of the invention herein to provide a door mechanism which produces a signal when the door is opened.

It is a still further object of the invention herein to provide a door mechanism of the above type which is characterized by a small number of parts efficiently utilized in a rugged and reliable structure.

A door mechanism according to the invention herein for an appliance, such as a toaster/oven, comprises a door, which may be generally rectangular having outside and inside surfaces connected by top, bottom and side surfaces. Aligned hinge pins protrude from the opposed side surfaces of the door, near the bottom surface thereof, and define a pivot axis for the door. Each hinge pin is spaced apart from the inside and bottom surfaces of the door, and geometrically the shortest distance from the hinge pin to the bottom surface is less than the distance from the hinge pin to the corner of the door where the bottom and inside surfaces meet. The door is pivotally mounted by the hinge pins to close the cooking chamber of the toaster/oven, the toaster/oven defining a door frame and jam to receive the door. The door frame surrounds the top, bottom and side surfaces of the door (when closed) and the jam is adjacent the marginal portions of the inside surface of the door (also when closed). The door frame is provided with an opening to receive one of the hinge pins protruding from the door, and is further provided with an elongated slot for receiving the hinge pin protruding from the opposite side of the door. The slot has an upper portion parallel to the door jam, and has a lower portion angled outwardly from the door jam, the hinge pin resting at the bottom of the angled portion of the slot during normal pivotal door operation. When the hinge pin is positioned at the bottom of the slot, the door can pivot between its open and closed position, and in particular, the bottom of the slot is spaced sufficiently far from the door jam to accommodate the corner of the door as it pivots between its opened and closed positions. When the door is in its fully opened position, the pin can be raised through the angled portion of the slot into the upper portion of the slot and raised until the hinge pin clears the slot due to the angle of the door in the door opening. The door can then be removed, and the process is reversed for reinstallation of the door. However, when the door is at least partially closed, it cannot be raised from the lower angled portion of the slot, because the corner of the door where the bottom and inside surfaces meet is spaced sufficiently far from the hinge pin to prohibit inward movement of the pin into the upper portion of the slot. Thus, the door is held in its pivotally mounted position in a remarkably simple manner requiring no latches, catches or the like, and yet is readily removable and replaceable.

The door mechanism further includes means for selectively retaining the door in a closed, a broil, and an open position. To this end, the door further comprises a generally arcuate arm which extends rearwardly from one of the sides of the door, the arcuate arm extending through an opening in the door jam. The end of the arcuate arm is provided with a stop which engages the back of the door jam or other cooperating stop means to hold the door in its open position. The arcuate arm also defines two notches which cooperate with a pin mounted to a spring biased, pivotally mounted lever arm to hold the door in the broil and closed positions. The pivotally mounted lever arm is positioned such that its pin engages and is biased against the arcuate arm in the vicinity of the notches, and biases the pin into an appropriate one of the notches for retaining the door in its closed or broil position. Moderate force will release the pin so that the door can be pivoted to a different position. The pin of the lever arm does not contact the arcuate arm when the door is in its open position, and hence does not interfere with the removal or replacement of the door, as discussed above.

The door mechanism further comprises switch means operated by the lever arm. In particular, when the lever arm is displaced against its spring bias by engagement with the arcuate arm of the door, the motion closes a first switch controlling power to the electrical heating element of the toaster/oven. When the door is opened beyond the broil position or removed, the lever arm disengages from the arcuate arm and is moved by its spring bias to open the first switch. This motion preferably closes a second switch to provide a signal of the open door condition to the controls of the toaster/oven, so that an appropriate adjustment of the cooking time, or the like, can be made. In the preferred embodiment, the switch means are two leaf spring switches alternately operated by a pivotally mounted bell crank, which is pivoted by the lever arm as the pin of the lever arm engages and disengages from the arcuate arm of the door.

Other features and objects of the invention herein will in part be obvious and will in part appear from a perusal of the following description of the preferred embodiment and the claims, taken together with the drawings.

DRAWINGS

FIG. 1 is a perspective view, partially cut away, of a toaster/oven incorporating a door mechanism according to the invention herein;

FIG. 2 is a side elevation view of the door mechanism with its door in the closed position;

FIG. 3 is a side elevation view of the door mechanism with its door opened to the broil position;

FIG. 4 is a perspective fragmentary view of a switch portion of the door mechanism;

The same reference numerals refer to the same elements throughout the various Figures.

DESCRIPTION OF PREFERRED EMBODIMENT

Figure 5:
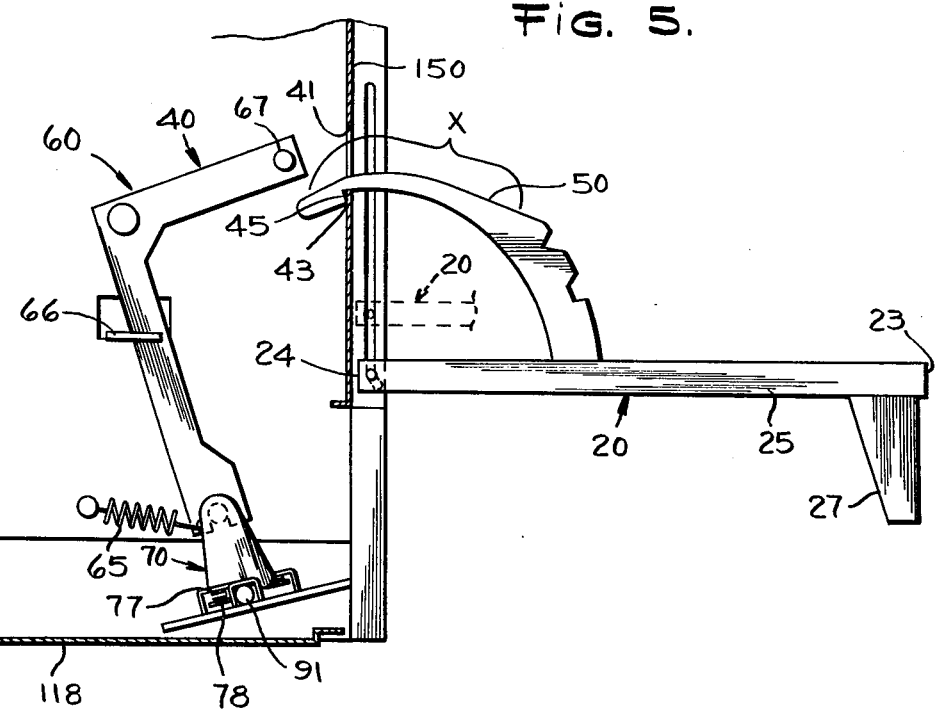
FIG. 5 is a side elevation view of the door mechanism with its door in the opened position.

FIG. 1 illustrates a toaster/oven 100 incorporating a door mechanism according to the invention herein, the door mechanism being generally indicated at 10.

The toaster/oven 100 comprises a housing 110 which is generally rectangular, having a top 112, sides 114 and 116, a lower front panel 120, a bottom 118 and a back (not shown). The toaster/oven 100 further comprises a cooking chamber 130, which is defined by a cooking chamber top panel 132 parallel to and spaced apart from the top 112 of the housing, and cooking chamber side panels 134 and 136, which are parallel to and spaced apart from the sidewalls 114 and 116 of the housing, respectively. A cooking chamber bottom panel 138 extends between the cooking chamber side panels, and it is spaced apart by a substantial distance from the bottom panel 118 of the housing, wherein electrical components, such as controls, switches, timers, thermostats and the like, may be accommodated. The bottom panel 138 of the cooking chamber 130 extends rearwardly from the top of the front panel 120 of the housing, wherein a front opening to the cooking chamber 130 is defined, further details of which will be discussed below. The front panel 120 may conveniently mount knobs, such as knobs 121, 122 and 123, for controlling operation of the toaster/oven 100, the knobs being linked to the controls, switches, etc. housed between the bottom panel 118 of the housing 110 and the bottom panel 138 of the cooking chamber 130. Upper heating elements 105 and 106 are provided near the cooking chamber top panel 132 and additional heating elements, not shown, are provided near the bottom cooking chamber panel 138.

Figure 6:
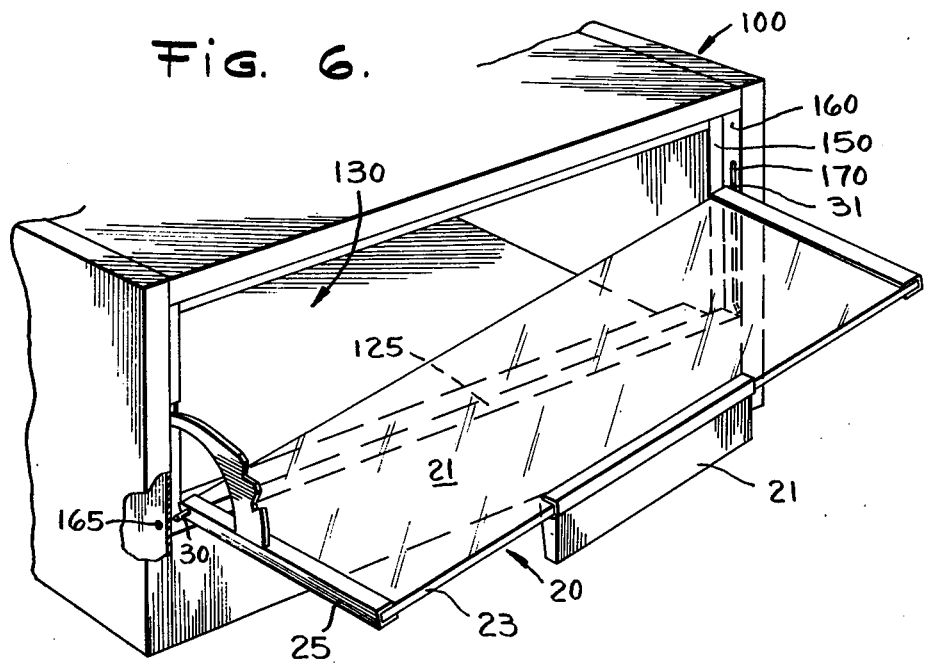
FIG. 6 is a perspective view of the front of the toaster/oven showing the door being removed therefrom.

As perhaps best seen in FIGS. 5 and 6, the toaster/oven 100 further comprises a door jam 150 and a door frame 160 at the entrance to the cooking chamber 130. The door jam 150 is comprised of front facing portions of the top and side cooking chamber panels, and the door frame is comprised of parallel offset portions of the top and side cooking chamber panels, as well as perpendicular flange 125 of the lower front panel 120. It will be appreciated that the door jam 150 and door frame 160 could also be formed of panels other than the cooking chamber panels, such as appropriately shaped portions of the top and side panels of housing 110 of the toaster/oven 100.

The door mechanism 10 comprises a door 20 sized to close the front opening of the cooking chamber 130, and particularly to fit into the door frame 160 adjacent the door jam 150. The door 20 has an inside surface 21 and an outside surface 22, and has a top 23, a bottom 24 and sides 25 and 26. In the embodiment shown, the door is in the form of a glass panel having metal end caps, wherein cooking processes in the cooking chamber 130 can be viewed with the door 20 in its closed position. A handle 27 mounted near the top of the door facilitates opening and closing it.

Hinge pins 30 and 31 protrude from the sides 25 and 26 of the door 20, respectively, and the hinge pins are aligned and provide a pivot axis for the door. As best seen in FIG. 2, hinge pin 30 is positioned approximately midway between the inside surface 21 and outside surface 22 of the door and is spaced upwardly from the bottom 24 of the door 20 by a distance D. Hinge pin 30 is spaced apart by distance C from the corner 29 of the door, the corner 29 being the intersection of the inner surface 21, the bottom 24 and the side 25. Geometrically, the distance C is greater than the distance D. Hinge pin 31 is similarly positioned on side 26 of door 20, as seen in FIG. 8.

The hinge pin 30 of the door 20 is received in an opening 165 (seen in FIG. 7) on one side of the door frame 160 of the toaster/oven, and the pin 31 is received in a slot 170 provided in the opposite side of the door frame 160, i.e. slot 170 is generally opposite the opening 165. The opening 165 is spaced from the door jam by at least distance C. As best seen in FIG. 8, the slot 170 includes an elongated upper portion 172, an outwardly angled lower portion 173 terminating at slot bottom 175. The slot bottom 175 is also spaced from the door jam by at least the distance C, and the hinge pin 31 of the door 20 normally rests in the slot bottom 175. The door 20 freely pivots between its closed position, shown in FIG. 2, its partially open position, shown in FIG. 3, and its fully opened position, shown in FIG. 5, and in particular, the corner 29 clears the door jam 150 to permit the free pivotal motion.

Figure 7:
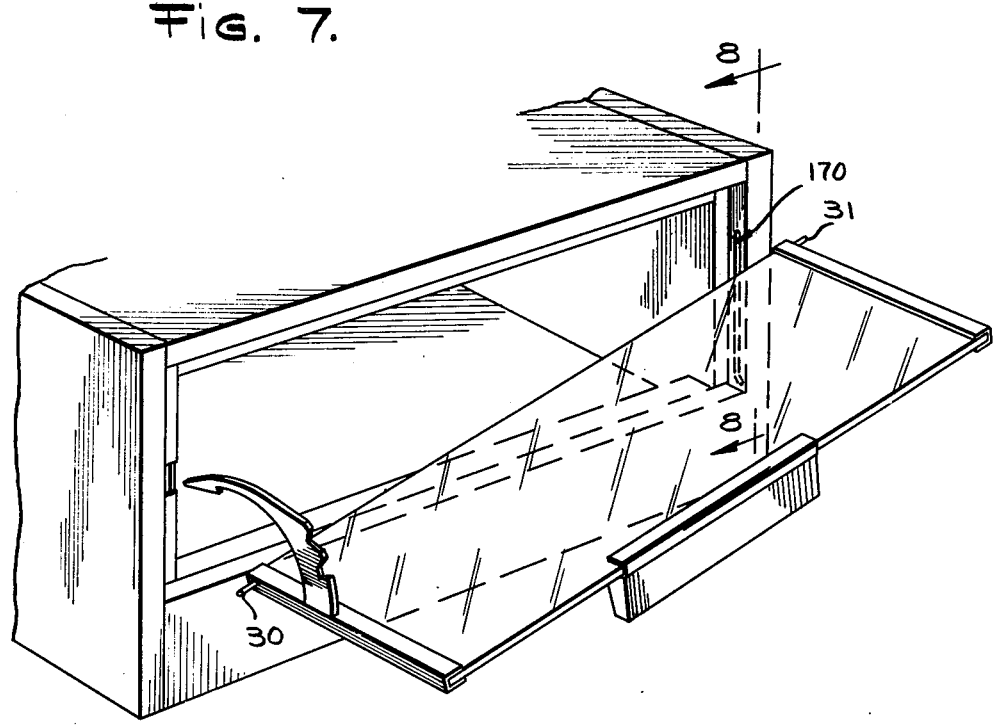
FIG. 7 is a perspective view of the front of the toaster/oven showing the door removed therefrom.

The door 20 may be removed from the toaster/oven 100 to facilitate cleaning of both the door itself and the interior of the cooking chamber 130. Removal of the door 20 is accomplished by placing the door 20 in its fully open position, as illustrated in FIG. 5. The door 20 is then manipulated to move hinge pin 31 through the angled lower portion 173 of the slot 170 into the elongated upper portion 172 of the slot 170, as illustrated in dotted lines in FIG. 5. With reference to FIGS. 6 and 7, the end of the door from which hinge pin 31 projects is raised until the hinge pin 31 clears the slot 170. Hinge pin 30 may then be withdrawn from the opening 165, and the door 20 removed.

Figure 8:
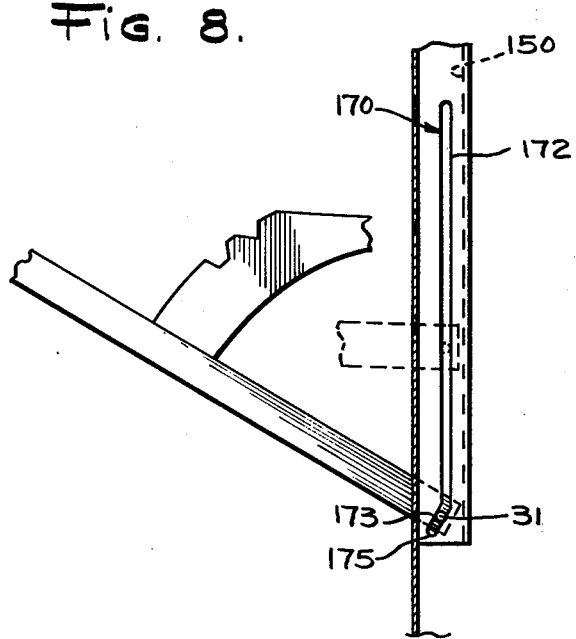
FIG. 8 is a side elevation view of the door in a partially open position.

It will be appreciated that the upper portion of the slot 170 is spaced apart from the door jam 150 by a distance which is less than the distance C and slightly greater than the distance D, wherein the hinge pin 31 of the door 20 can be manipulated into the upper portion 172 of the slot 170 when the door is in its fully opened position, but cannot be manipulated into the upper portion 172 of slot 170 when the door is at least partially closed, as illustrated in FIG. 8. Therefore, the hinge pins 30 and 31 of the door 20 are effectively held along the desired pivot axis for opening and closing the door 20 with very little or no tendency for the door 20 to ride up in the slot 170, except when the particular manipulation for removal of the door is performed. The door 20 is replaced by reversing the aforesaid procedure, in particular, by inserting the pin 30 in the opening 165, and placing the pin 31 in the slot 170 and sliding it to its position at the slot bottom 175 of slot 170, the door 20 being held horizontal to achieve the necessary clearance.

The door mechanism 10 for the toaster/oven 100 further comprises a door retention means 40 for selectively retaining the door 20 in its closed, partially open broil, and fully opened positions. The door retention means 40 includes a generally arcuate arm 50 which extends rearwardly from the door 20 near the side edge 25 thereof. The arcuate arm 50 is accommodated in an opening 41 in the door jam 150, the opening 41 being sufficiently large to permit the necessary sideways displacement of the arcuate arm 50 in removing and replacing the door 20. The end of the arcuate arm 50 opposite the door 20 is provided with a stop 45, which engages the back of the door jam 150, as indicated at 43 in FIG. 5, to limit the range of pivotal movement of the door 20 and hold the door in its horizontal open position. The upper surface of the arcuate arm 50 is provided with two notches 52 and 55. The notch 52, which is closer to the door 20, has an angled entry/exit portion 53 on one side thereof, and a vertical stop portion 54 on the side thereof closer to the door. The notch 55 is generally V-shaped wherein it has angled entry/exit surfaces.

The door retention means 40 of the door mechanism 10 further comprises a lever arm 60 which is generally L-shaped having legs 61 and 62. The lever arm 60 is pivotally mounted to toaster/oven 100, and conveniently to the cooking chamber side panel 134, by means of a pin 163, with the pivot point approximately at the intersection of the legs 61 and 62. The lever arm 60 is biased for clockwise rotation, as viewed in FIGS. 2 and 3, by a coil spring 65 attached between the lower end of the leg 62 and a pin 64 mounted to the cooking chamber side panel 134, although rotation is limited by a stop member 66 also mounted to the panel 134. With reference to FIG. 5, the coil spring 65 has biased the lever arm 60 against the stop 66.

A pin 67 protrudes laterally from the leg 61 of lever arm 60, near the end thereof, for engaging the arcuate arm 50. As the door 20 is pivoted from the open position shown in FIG. 5 toward its closed position, the pin 67 engages the arcuate arm 50 near the notch 55, and rides into the notch 55, as shown in FIG. 3. Coil spring 65 biases the pin 67 against the arcuate arm 50 and in particular holds pin 67 positioned in the notch 55, whereby the door 20 is retained in its partially open broil position. Because the notch 55 is substantially V-shaped, the pin 67 can be disengaged from the notch 55 by exertion of moderate force in pivoting the door 20.

As the door 20 is pivoted to its closed position, the pin 67 rides over the portion of the arcuate arm between the notches 55 and 52, and the pin 67 seats in the notch 52 to retain the door in its closed position shown in FIG. 2. Again, a moderate exertion of force in pivoting the door from its closed position causes the pin 67 to ride up the angled portion 53 of the notch 52, permitting the door to be pivoted to its partially open broil position or fully open position. It will be noted that the arcuate arm 50, when viewed from the side, is shaped such that the pin 67 does not engage the arcuate arm between the notch 55 and the end stop 45, i.e. along the portion of the arm indicated at X in FIG. 5. The lever arm 60 is engaged against its stop 66 as the arcuate arm 50 travels under pin 67 over the "X" portion of the arm. Therefore, there is no engagement between pin 67 and the arcuate arm 50 which would interfere with the removal and replacement of the door 20, as described above. The door retention means 40 has most of its parts concealed within the housing of the toaster/oven 100 and only the arcuate arm 50 is mounted to the door 20. The door retention means 40 achieves the desired function of selectively retaining the door in its closed, partially open, and fully open positions, and the door retention means 40 is particularly advantageous because no disassembly is required to remove the door 20 or to replace it.

The door mechanism 10 further comprises a switch assembly 70 which cuts off power to the heating elements of the toaster/oven 100 when the door 20 is opened beyond the broil position. The switch assembly 70 also preferably provides a signal to the controls of the toaster/oven 100 when the door 20 is opened beyond the broil position, such that the controls can compensate for the interruption in operation of the heating elements. The switch assembly 70 comprises a plate 72 mounted within the housing 110 of the toaster/oven below the lever arm 60, the plate 72 having two U-shaped terminals 75 and 80 secured thereto. The free end of a flexible leaf spring conductor 76 is disposed under the U-shaped terminal 75, and contact to the points 77 and 78 are provided respectively on the terminal 75 and the leaf spring conductor 76. The terminal 75 and the conductor 76 are connected into the electrical circuit of the toaster/oven such that the heating elements may operate, as determined by other controls, when the contact points 77 and 78 are together, but the electrical power is cut off to the heating elements when the contact points 77 and 78 are separated. A second leaf spring conductor 81 is positioned under the U-shaped terminal 80, and the U-shaped terminal 80 and leaf spring conductor 81 are provided with contact points 82 and 83, respectively. The U-shaped terminal 80 and the leaf spring conductor 81 are electrically connected to the controls of the toaster/oven 100, and in particular, when the contact points 82 and 83 are closed, a signal is produced indicating that the power has been cut off to the heating elements of the toaster/oven.

A bell crank 90 has an integral shaft 91 which is captured between the U-shaped terminals 75 and 80 and the plate 72, thereby mounting the bell crank 90 for rocking pivotal motion. The bell crank 90 has two lobes 92 and 93 which respectively engage the leaf spring conductors 76 and 81. The upper portion of the bell crank 90 has a shaft 95 extending outwardly therefrom, and the shaft 95 is captured in a slot opening 68 defined by the bifurcated end of leg 62 of the lever arm 60. Thus, motion of the end of the leg 62 of the lever arm 60 acts to rock the bell crank 90 and operate the switch mechanism 70. With particular reference to FIG. 2, the pin 67 of the lever arm 60 is engaged against the arcuate arm 50, whereby the lever arm 60 is rotated counterclockwise from its stop 66. The bell crank 90 is thereby rocked such that lobe 93 displaces the leaf spring conductor 81 downwardly to open the contact points 82 and 83. The lobe 92 of the bell crank 90 is "lifted" permitting leaf spring conductor 76 to close the contact points 77 and 78, wherein power may be provided to the heating elements of the toaster/oven. With reference to FIG. 3 in which the door 20 is in its partially open broil position, the lever arm 60 has the same orientation as in FIG. 2, wherein the contact points 77 and 78 are closed such that power may be provided to the electrical heating elements. With reference to FIG. 5, when the door 20 is in its open position, and more particularly when the pin 67 is released from engagement with the arcuate arm 50 of the door, the lever arm 60 is rotated clockwise by spring 65 to rest against its stop 66. Thus, the bell crank 90 is rocked about its shaft 91 such that lobe 92 engages and downwardly displaces the leaf spring conductor 76, opening the contact points 77 and 78 to shut off power to the electrical heating elements. Also, the lobe 93 is "lifted" wherein leaf spring conductor 81 closes the contact points 82 and 83 to provide a signal to the controls that the power has been shut off to the heating elements of the toaster/oven 100.

Figure 9:
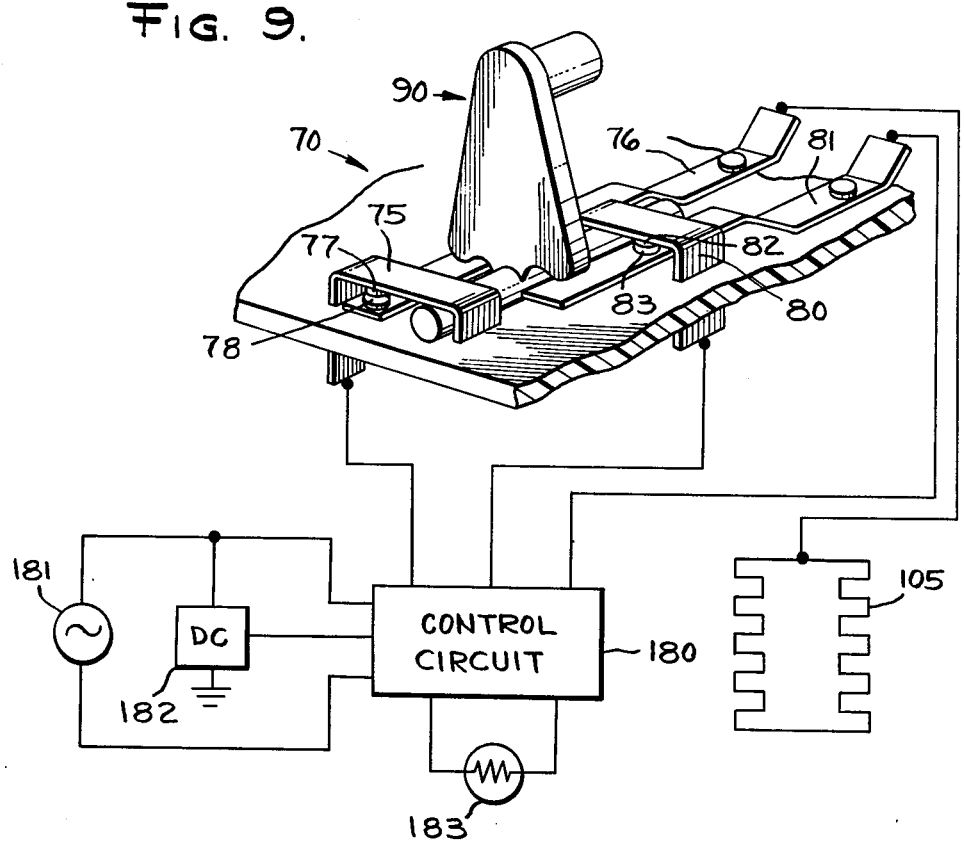
FIG. 9 is a schematic view of a control circuit of the toaster/oven connected to the switch portion of the door mechanism.

This is illustrated in FIG. 9, which includes a schematic circuit diagram of the toaster/oven 100. The toaster/oven 100 comprises a control circuit 180, which receives AC power from a power source 181 and DC power from a DC voltage supply 182. The heating elements, all designated at 105, receive power from the control circuit 180 through the terminal 75 and the leaf spring conductor 76, wherein power is not available if the contact points 77 and 78 are open. A temperature sensor 183 and switches, controls and thermostat portions of the control circuit also control the power to the heating elements, but are overridden by the switch means if the door is open. The control circuit also derives a signal by conduction through the contact points 82 and 83 associated with the terminal 80 and leaf spring conductor, those contact points being closed to provide the signal when the door is open. The control circuit 180 is preferably adapted to make adjustments to cooking time depending upon the duration of the "door open" signal.

Thus, an advantageous door mechanism for a toaster/oven has been described, and it exhibits many desirable features, including easy removal and replacement of the door, selective positioning of the door, shut off of power to the heating elements as the door is opened beyond its broil position and signalling to controls when the door is opened. All of these desirable features are achieved by simple and dependable structure.

It will be appreciated that a preferred embodiment has been described and that changes can be made. For instance, different switch means could be employed, different spring bias means could be used, and the arrangement of parts could be altered while retaining the same functions. These and other changes can be made by those skilled in the art without departing from the spirit and scope of the invention, which is limited only by the following claims.

I claim:

1. A toaster/oven comprising:
    a housing and a cooking chamber defined within the housing by a cooking chamber bottom panel, cooking chamber side panels, a cooking chamber top panel and a back panel, the panels being mounted to the housing and forming a part thereof, and the cooking chamber having an opening at the front of the housing for inserting and removing food items;
    a removable door, the door having an outside surface, an inside surface, top, bottom and sides, and having a first hinge pin protruding from one side near the bottom thereof, and a second hinge pin protruding from the opposite second side, the hinge pins being aligned and defining a pivot axis of the door, each hinge pin located from the bottom of the door and at a greater distance from the corner of the door where the inside surface, bottom and side of the door intersect; and
    a door jam and door frame surrounding the cooking chamber opening and sized to receive the door within the door frame adjacent the door frame, the door frame including opposed side surfaces, one of the door frame side surfaces defining an opening receiving the first hinge pin, and the other door frame side surface defining a slot for receiving the second hinge pin, the slot having an elongated upper portion separated from the door jam and an outwardly angled bottom portion terminating at a slot bottom separated from the door jam,
    wherein the second hinge pin normally rests in the slot bottom whereby the door can pivot from a closed position to a horizontal open position with the door corners clearing the door jam, and wherein the door can be removed by positioning it in its horizontal open position and sliding the second hinge pin upwardly through the outwardly angled bottom portion of the slot and the upper portion of the slot until the second hinge pin clears the slot, the door being replaceable by reversing the aforesaid procedure.

2. A toaster/oven as defined in claim 1 wherein the door comprises a glass panel having metal side caps to which the hinge pins are mounted, the door further comprising a handle extending outwardly from the outside surface near the top thereof.

3. A toaster/oven as defined in claim 1 and further comprising:
    door retention means for selectively holding the door in its closed position and in its horizontal open position, the door retention means including
    a generally arcuate arm mounted to the side of the door from which the first hinge pin protrudes, the generally arcuate arm extending from the rear of the door through an opening defined in the door jam, the arcuate arm having an end stop surface near the free end thereof which engages a stop mounted to the housing for holding the door in its horizontal open position, and the arm defining a first notch spaced apart from the end stop surface, and a pin spring biased against the arcuate arm in the vicinity of the first notch, the pin spring biased into said notch when the door is in its closed position wherein the engagement of the pin in the notch holds the door in its closed position.

4. A toaster/oven as defined in claim 3 wherein the arcuate arm is shaped and the pin movement restricted such that the pin does not engage the arcuate arm when the door is in its horizontal open position, whereby the pin does not interfere with the removal and replacement of the door.

5. A toaster/oven as defined in claim 4 wherein the arcuate arm defines a second notch for receiving the spring biased pin when the door is in a partially open broil position, the engagement of the pin in the second notch holding the door in the partially open broil position.

6. A toaster/oven as defined in claim 5 wherein the pin is mounted to a lever arm pivotally mounted to the housing, the lever arm spring biased to urge the pin against the arcuate arm in the vicinity of the first and second notches and the lever arm resting against stop means mounted to the housing to restrict the pin movement and hold the pin separated from the arcuate arm as the door is pivoted to its fully open horizontal position.

7. A toaster/oven as defined in claim 6 and further comprising first switch means operated by the lever arm to cut off power to heating elements of the toaster/oven when the pin is disengaged from the arcuate arm, whereby the heating elements are not operable when the door is pivoted to its horizontal open position.

8. A toaster/oven as defined in claim 7 and further comprising second switch means operated by the lever arm when the pin is disengaged from the arcuate arm, said second switch means providing a signal to the controls when the power is cut off to the heating elements.

9. A toaster/oven as defined in claim 7 wherein a bell crank is pivotally mounted to the housing and rocked by the lever arm to operate the first switch means.

10. A toaster/oven as defined in claim 8 wherein the first switch comprises a terminal and a leaf spring conductor adjacent to and biased for contact with the terminal, and the bell crank displaces the leaf spring conductor from the terminal to open the switch and cut off power to the heating elements of the toaster/oven.

11. A toaster/oven as defined in claim 8 wherein a bell crank is pivotally mounted to the housing and rocked by the lever arm to operate the first and second switch means.

12. A toaster/oven as defined in claim 11 wherein the bell crank has a pivot axis and two lobes, one lobe disposed on one side of the pivot axis and the other lobe disposed on the other side of the pivot axis, and said first and second switch means each comprise a terminal and a leaf spring conductor adjacent the terminal and biased for contact therewith, the leaf spring conductor of the first switch means positioned for engagement by one lobe at the bell crank and the leaf spring conductor of the second switch means positioned for engagement by the other lobe of the bell crank, whereby when the lever arm rocks the bell crank to engage its first lobe with the leaf spring conductor of the first switch means it separates that leaf spring conductor from its terminal to cut off power to the heating elements and the second lobe disengages from the leaf spring conductor of the second switch means permitting it to contact its terminal to provide a signal that power is cut off to the heating elements, and when the lever arm rocks the bell crank to engage its second lobe with the leaf spring conductor of the second switch means, it separates that leaf spring conductor from its terminal so that no signal is produced and the first lobe disengages from the leaf spring conductor of the first switch means permitting it to contact its terminal to provide power to the heating elements.

13. A toaster/oven comprising:

a housing and cooking chamber panels mounted within the housing to define a cooking chamber, the cooking chamber having an opening at the front of the housing for inserting and removing food items;

electrical heating elements positioned within the cooking chamber and a control circuit providing electrical power to the heating elements;

a door having its bottom portion pivotally mounted to the housing, the door pivotal between a horizontal open position and a closed position closing the cooking chamber;

an arcuate arm extending from one side of the door through an opening in the housing and into the housing, the arm having an end stop portion which engages the housing adjacent the opening through which the arm is accommodated to limit the opening of the door to its horizontal open position and to hold the door thereat, the arcuate arm further defining a first notch;

a lever arm pivotally mounted in the housing and having a pin extending therefrom, the lever arm spring biased to engage the pin against the arcuate arm in the vicinity of the first notch, wherein the pin is spring biased into the first notch when the first notch is adjacent the pin, the first notch and pin positioned such that engagement of the pin in the first notch holds the door in its closed position, and wherein the pin is disengaged from the lever arm when the door is in its open position; and first switch means controlling the supply of power from the control circuit to the heating elements, the first switch means opened by the pivotal movement of the lever arm as the pin disengages from the arcuate arm whereby power to the heating elements is cut off when the door is open.

14. A toaster/oven as defined in claim 13 wherein the arcuate arm defines a second notch, the lever arm spring biased against the arcuate arm in the vicinity of the second notch, wherein the pin is spring biased into the second notch when the second notch is adjacent the pin, the second notch positioned such that engagement of the pin in the second notch holds the door in a partially open broil position.

15. A toaster/oven as defined in claim 14 wherein the first and second notches are defined on the arcuate arm between the door and the stop portion of the arcuate arm.

16. A toaster/oven as defined in claim 15 and further comprising:

second switch means providing a signal to the control circuit, the second switch means closed by pivotal movement of the lever arm as the pin disengages from the arcuate arm whereby a signal is provided to the control circuit when the door is open.

17. A toaster/oven as defined in claim 16 and further comprising:

a bell crank pivotally mounted to the housing and rocked by the lever arm to operate the first and second switch means.

18. A toaster/oven as defined in claim 17 wherein the bell crank has a pivot axis and two lobes, one lobe disposed on one side of the pivot axis and the other lobe disposed on the other side of the pivot axis, and said first and second switch means each comprise a terminal and a leaf spring conductor adjacent the terminal and biased for contact therewith, the leaf spring conductor of the first switch means positioned for engagement by one lobe at the bell crank and the leaf spring conductor of the second switch means positioned for engagement by the other lobe of the bell crank, whereby when the lever arm rocks the bell crank to engage its first lobe with the leaf spring conductor of the first switch means it separates that leaf spring conductor from its terminal to cut off power to the heating elements and the second lobe disengages from the leaf spring conductor of the second switch means permitting it to contact its terminal to provide a signal that power is cut off to the heating elements, and when the lever arm rocks the bell crank to engage its second lobe with the leaf spring conductor of the second switch means, it separates that leaf spring conductor from its terminal so that no signal is produced and the first lobe disengages from the leaf spring conductor of the first switch means permitting it to contact its terminal to provide power to the heating elements.

* * * * *